United States Patent [19]
Ishikawa et al.

[11] Patent Number: 5,695,799
[45] Date of Patent: Dec. 9, 1997

[54] PROCESS FOR PRODUCING WHEAT FLOUR AND WHEAT FLOUR PRODUCTS

[75] Inventors: Hiromi Ishikawa; Ikumi Iwasa, both of Chiba, Japan

[73] Assignee: Showa Sangyo Co., Ltd., Tokyo, Japan

[21] Appl. No.: 616,784

[22] Filed: Mar. 15, 1996

Related U.S. Application Data

[63] Continuation of Ser. No. 385,838, Feb. 9, 1995, abandoned.

[30] Foreign Application Priority Data

Feb. 9, 1994 [JP] Japan .............................. HEI 6-050038

[51] Int. Cl.$^6$ .................. A21D 2/08; A23L 1/16
[52] U.S. Cl. .................. 426/268; 426/269; 426/270; 426/331; 426/557; 426/622
[58] Field of Search .................. 426/262, 268, 426/269, 270, 331, 540, 557, 622

[56] References Cited

U.S. PATENT DOCUMENTS

4,956,190  9/1990  Chawan et al. .................. 426/269

FOREIGN PATENT DOCUMENTS

| 63157950 | 6/1988 | Japan . |
| 2293054 | 12/1990 | Japan . |
| 5260915 | 10/1993 | Japan . |

OTHER PUBLICATIONS

Uchino et al, Agric. Biol. Chem., 52, 2609 (1988).
Finney et al, "Speck Count", *Wheat and Wheat Improvement*, Second Edition, Agronomy, No. 13, Section 10-4.3.5, p. 732 (1987).

Taneja et al, "Modulation of o-Diphenolase and Monophenolase Enzymes during Wheat Grain Development" *Modulation of Enzymes*, 51:457-465 (Jul.-Aug., 1974).
Siddiq et al, "Characterization of Polyphenoloxidase from Stanley Plums", *J. of Food Science*, 57(5):1177-1179 (1992).
Pierpoint, "o-Quinones Formed in Plant Extracts: Their Reaction with Amino Acids and Peptides", *Biochem, J.*, 112:609-616 (1969).
Murao et al, "Purification and Characterization of *Arctium lappa*L. (Edible Burdock) Polyphenol Oxidase", *Biosci. Biotech. Biochem.*, 57(2):177-180 (1993).
Ôba et al, "Partial Purification and Characterization of Polyphenol Oxidase Isozymes in Banana Bud", *Biosci. Biotech. Biochem.*, 56(7):1027-1030 (1992).

*Primary Examiner*—Arthur L. Corbin
*Attorney, Agent, or Firm*—Sughrue, Mion, Zinn, Macpeak & Seas, PLLC

[57] ABSTRACT

This invention provides a wheat flour whereby speck formation in a secondarily processed product can be prevented and the deterioration in the color tone due to discoloration can be prevented. To treat tyrosinase of wheat bran which remains in wheat flour in the flour producing process and causes speck formation, a tyrosinase inhibitor is added prior to a roller milling step, preferably in a conditioning step. Examples of the tyrosinase inhibitor include kojic acid, cysteine, glutathione, ascorbic acid, dithiothreitol, phytic acid, EDTA, isonicotinic acid hydrazide, p-aminosalicylic acid, ferulic acid, thiamine, peptides and combinations thereof. In particular, kojic acid and cysteine are preferable as a tyrosinase inhibitor. The wheat flour thus obtained is usable, for example, in making fresh noodles, dried noodles and tenobe somen in a secondarily processed product.

9 Claims, No Drawings

PROCESS FOR PRODUCING WHEAT FLOUR AND WHEAT FLOUR PRODUCTS

This is a Continuation of application Ser. No. 08/385,838, filed Feb. 9, 1995, now abandoned.

FIELD OF THE INVENTION

This invention relates to a wheat flour which is used in preparing fresh (undried) noodles, dried noodles and tenobe somen (hand-made thin wheat noodles) and a process for producing the same. More particularly, the present invention relates to a process for suppressing or preventing the formation of dark brown spots (i.e., specks) and the deterioration in color tone, both of which occur after the preparation and proceed with the passage of time in fresh noodles (in particular, udon noodles, Chinese noodles, pasta wrapping for jiaozi, etc.), dried noodles and tenobe somen.

A known process for producing wheat flour comprises steps of: cleaning grains; conditioning (damping and tempering) the cleaned grains; and roller milling (grinding) the conditioned grains as described in R. Carl Hoseney, *Principles of Cereal Science and Technology*, Chapter 6 "Dry Milling of Cereals".

The term "udon" as used herein means those noodles prepared by kneading wheat flour together with water and sodium chloride and then formulating the obtained dough into noodles (optionally followed by boiling or steaming), for example, hiramen (flat noodles), hiyamugi, and somen, as specified in the Fair Trade Agreement on the Indication of Fresh Noodles (Japan Fresh Noodle Fair Trade Association).

The term "Chinese noodles" as used herein means those noodles prepared by kneading wheat flour together with brine, alkaline agents, etc. and then formulating the obtained dough into noodles (optionally followed by boiling, steaming or frying), as well as those noodles prepared in a similar manner, as specified in the Fair Trade Agreement on the Indication of Fresh Noodles (Japan Fresh Noodle Fair Trade Association).

The term "the pasta wrapping for jiaozi" as used herein means those wrappings prepared by kneading wheat flour together with water or brine, etc., rolling out the obtained dough and then molding it into the paste wrapping for jiaozi, wan'tan, shaomai, spring roll, etc., as specified in the Fair Trade Agreement on the indication Of Fresh Noodles (Japan Fresh Noodle Fair Trade Association).

The term "dried noodles" as used herein means those noodles prepared by kneading wheat flour and/or buckwheat flour, which optionally contains barley flour, rice flour, tea powder, egg, etc., together with sodium chloride, water, etc., formulating the obtained dough into noodles and then drying, as indicated in Japan Agricultural Standards Specification.

The term "tenobe somen" as used herein means those noodles prepared by kneading wheat flour together with sodium chloride, water, etc., applying edible oil onto the obtained dough, stretching it under twining into stick noodles and then drying, as indicated in Japan Agricultural Standards

SPECIFICATION

Background of the Invention

Although fresh noodles have a light color tone immediately after preparation, they suffer from the formation of dark brown spots (i.e., specks) and a deterioration in the color tone, due to discoloration, during distribution and preservation in the undried state. Similarly, dried noodles and tenobe somen undergo a deterioration in the color tone within the period of time occurring from the completion of their preparation to drying.

It is reported that these specks are attributable to an enzyme (i.e., tyrosinase) contained in wheat bran which contaminates wheat flour (JP-A-5-260915; the term "JP-A" as used herein means an "unexamined published Japanese patent application"). Namely, it is believed that tyrosinase, contained in wheat bran and therearound, which has been almost completely eliminated in the wheat flour producing process but ground in a small amount in the roller milling step and dispersed in wheat flour, causes the specks.

Although wheat flour contaminated with only a small amount of wheat bran (containing a little ash) is employed, in general, in order to prevent the deterioration in the commercial value and qualities of noodle products, only unsatisfactory effects can be thus achieved. A method has been proposed comprising adding a tyrosinase inhibitor to wheat flour so as to treat the tyrosinase dispersed in wheat flour [Uchino et al., *Agric. Biol. Chem.*, 52, 2609 (1988)].

In the above-mentioned method, the formation of the specks in, for example, fresh noodles is suppressed by adding kojic acid, which is a tyrosinase inhibitor, to wheat flour. In this case, however, it is necessary to add a relatively large amount of kojic acid, since wheat bran is dispersed in the wheat flour. The addition of kojic acid in an amount of 0.1% or more based on the amount of wheat flour makes noodles yellow. Therefore, this method is hardly applicable to noodles such as udon which should retain the white coloring (JP-A-63-157950).

In addition, the conventional method is less efficient, since a tyrosinase inhibitor is added to wheat flour having tyrosinase dispersed therein. Thus, some tyrosinase inhibitors (for example, cysteine, glutathione, α-tocopherol, ascorbic acid) cannot suppress speck formation even though they are added in a large amount [Uchino et al., *Agric. Biol. Chem.*, 52, 2609 (1988)]. That is, only limited tyrosinase inhibitors such as kojic acid and hinokitiol (JP-A-5-260915) are effective in suppressing the speck formation.

On the other hand, a patent application has been filed which includes a method wherein a reducing agent such as ascorbic acid, cysteine or glutathione comes into contact with wheat flour in a step of tempering (U.S. Pat. No. 4,956,190). In this case, however, the reducing agent is used in order to "protects the edible material being tempered from chemical or photo degradation of the natural vitamins and coloring agents, including but not limited to carotenoids (such as beta-carotene), chlorophylls, xanthophylls, and related lipoxydase-linoleate system". Namely, the addition of the reducing agent is to prevent the decomposition of carotenoid colorants. Therefore, this patent application does not suggest the object of preventing the formation of dark brown spots (i.e., specks), etc. caused by tyrosinase.

Accordingly, the above-mentioned method completely differs in purpose from the process of the present invention in which a wheat flour free from the disadvantages (for example, speck formation) induced by tyrosinase contained in wheat bran and therearound is produced by treating the tyrosinase with a tyrosinase inhibitor.

An object of the present invention is to provide a wheat flour, which is excellent in suppressing the deterioration in the qualities of secondarily processed products even at a minimal content of a tyrosinase inhibitor. This is achieved by contacting a tyrosinase inhibitor, which has been known to suppress speck formation, or another tyrosinase inhibitor, which has been considered to exert no speck suppressing effect, with tyrosinase contained in wheat bran efficiently.

Another object of the present invention is to produce a wheat flour whereby speck formation in a secondarily processed product can be suppressed and the deterioration in the color tone due to discoloration can also be suppressed.

More particularly, an object of the present invention is to provide a process for producing a wheat flour whereby speck formation in, for example, fresh noodles can be suppressed and the deterioration in the color tone due to discoloration can also be suppressed. Another object of the invention is to provide a wheat flour whereby speck formation in a secondarily processed product can be suppressed and the deterioration in the color tone due to discoloration can also be suppressed.

The present invention has been completed based on a finding that, when a tyrosinase inhibitor with a known effect of suppressing speck formation is added to a wheat grain in a skillful manner, then speck formation in a secondarily processed product can be suppressed even though the tyrosinase inhibitor is contained in the wheat flour in a reduced amount compared with the conventional methods.

Accordingly, the present invention makes it possible to efficiently contact the tyrosinase inhibitor with tyrosinase located outside wheat grains by adding the tyrosinase inhibitor to unground wheat in the wheat flour producing process. As a result of this highly efficient contact, a wheat flour is produced whereby speck formation in a secondarily processed product is suppressed and the deterioration in the color tone due to discoloration is also suppressed.

SUMMARY OF THE INVENTION

The present invention provides a process for producing wheat flour comprising adding a tyrosinase inhibitor to wheat grain prior to the step of roller milling said wheat grain and a wheat flour produced thereby. The tyrosinase inhibitor used in the present invention is preferably added in a conditioning step.

The process of the present invention can comprise the steps of: cleaning grains; conditioning the cleaned grains; and roller milling the conditioned grains.

DETAILED DESCRIPTION OF THE INVENTION

Examples of the tyrosinase inhibitor to be used in the present invention include kojic acid, cysteine, glutathione, ascorbic acid, dithiothreitol, phytic acid, EDTA (ethylenediaminetetraacetic acid), isonicotinic acid hydrazide, p-aminosalicylic acid, ferulic acid, thiamine, erythorbic acid, hinokitiol, peptides and combinations of these substances. These tyrosinase inhibitors may be used in the form of a salt. Among these substances, kojic acid and cysteine are preferable, in particular. Kojic acid is most preferable.

The amount of the tyrosinase inhibitor to be added to the unground wheat varies depending on the tyrosinase inhibitor employed. As a guide, the inhibitor is to be added in such an amount that an increase in specks in, for example, fresh noodles prepared by using the ground wheat flour can be suppressed compared with a control sample (no addition), but the tyrosinase inhibitor per se causes no coloration of the fresh noodles. In the case of kojic acid or cysteine, for example, the amount to be added ranges from about 10 to 5,000 ppm, preferably from about 50 to 3,500 ppm, based on the weight of the wheat flour.

The tyrosinase inhibitor of the present invention may be added in the following manner:

Wheat is conditioned with the use of a solution of the tyrosinase inhibitor to thereby add the tyrosinase inhibitor to the wheat. Alternatively, the tyrosinase inhibitor may be added before, during or after a conditioning step. Preferable procedures are as follows:

In a step of adding water, a suspension or a solution of the tyrosinase inhibitor is used for the place of water, and the mixture is thoroughly stirred to thereby uniformly mix the wheat with the tyrosinase inhibitor. Alternatively, the tyrosinase inhibitor, which is in the form of a powder, granules or crystals, or a suspension or a solution, is added to the wheat before, during or after the conditioning step. Then the mixture is thoroughly stirred to thereby uniformly mix the wheat with the tyrosinase inhibitor.

In a common milling process, the pH value is not particularly adjusted. When the addition of the tyrosinase inhibitor in accordance with the present invention might affect the pH value of the secondarily processed product, however, the pH value of the suspension or solution of the tyrosinase inhibitor may be regulated to about 5 to 9, preferably about 6 to 8.

By adding the tyrosinase inhibitor to the unground wheat, the tyrosinase inhibitor can be efficiently contacted with the tyrosinase contained in the wheat bran existing outside the wheat grains and therearound, which makes it possible to provide a wheat flour whereby speck formation in a secondarily processed product, such as fresh noodles, can be suppressed and the deterioration in the color tone due to discoloration can also be suppressed.

Since the tyrosinase inhibitor efficiently comes into contact with the tyrosinase contained in the wheat bran existing outside the wheat grains and therearound, the tyrosinase inhibitor can be almost entirely eliminated together with the wheat bran in the milling process. Thus, the residual tyrosinase inhibitor is dispersed in the wheat flour together with the wheat bran which remains in a small amount in the wheat flour. The wheat flour thus provided can suppress the speck formation in a secondarily processed product such as fresh noodles and the deterioration in the color tone due to discoloration, even though the flour contains the tyrosinase inhibitor in only a small amount compared with the conventional method.

The present invention makes it possible for the first time to utilize a tyrosinase inhibitor (for example, cysteine), which cannot suppress the speck formation in the conventional methods. The process of the present invention comprises adding the tyrosinase inhibitor to the unground wheat to thereby efficiently contact it with the tyrosinase.

Also, kojic acid, which has been regarded as hardly applicable to noodles to be maintained in a white color such as udon because of its nature of turning to yellow per se, can be efficiently contacted with tyrosinase and, therefore, can be employed in a reduced amount compared to the conventional methods.

Furthermore, the present invention makes kojic acid usable in noodles to be maintained in a white color (for example, udon) without further adding any chelating agent, etc. which is required in the conventional method (JP-A-63-157950). In the case of dried noodles and tenobe somen, the present invention also makes it possible to suppress changes such as speck formation occurring in an undried state with the passage of time, and thus one can obtain products capable of sustaining a white color.

To further illustrate the present invention in greater detail, the following Examples are provided which in no way limit the present invention.

EXAMPLE 1

Preparation of wheat flour 3 g, 1 g, 0.1 g and 0.01 g portions of kojic acid were added to 71.5 g of water. Further, 750 mg, 250 mg, 25 mg and 2.5 mg portions of sodium carbonate were, respectively, added thereto to yield 4 kojic acid solutions (pH 7.2). By using each kojic acid solution, 2 kg of wheat was conditioned at room temperature. The samples thus obtained were referred to, respectively, as a kojic acid 1500 ppm lot, a kojic acid 500 ppm lot, a kojic acid 50 ppm lot and a kojic acid 5 ppm lot.

10 g, 1 g, 0.1 g and 0.01 g portions of cysteine hydrochloride were dissolved respectively in 71.5 g of 1N NaOH, 71.5 g of 0.1N NaOH, 71.5 g of 0.01N NaOH and 71.5 g of 0.001N NaOH to thereby give cysteine solutions (pH 6.9). By using each cysteine solution, 2 kg of wheat was conditioned at room temperature. The samples thus obtained were referred to, respectively, as a cysteine 3500 ppm lot, a cysteine 350 ppm lot, a cysteine 35 ppm lot and a cysteine 3.5 ppm lot.

Each of the samples of the kojic acid lots and the cysteine lots was ground with a Bühler test mill and thus divided into 8 fractions including 3 break flours (1B, 2B and 3B), 3 middlings flours (1M, 2M and 3M) and large wheat bran and small wheat bran as described in "Revisional edition, Wheat Flour—raw material and secondarily processed product thereof—(Japan Barley and wheat Society)".

Then, the content of kojic acid or cysteine in the 1M fraction of each lot was determined. The kojic acid 1500 ppm lot, the kojic acid 500 ppm lot, the kojic acid 50 ppm lot and the kojic acid 5 ppm lot contained, respectively, 15 ppm, 5 ppm, 0.5 ppm and 0.05 ppm of kojic acid, while the cysteine 3500 ppm lot, the cysteine 350 ppm lot, the cysteine 35 ppm lot and the cysteine 3.5 ppm lot contained, respectively, 30 ppm, 3 ppm, 0.3 ppm and 0.03 ppm of cysteine.

Production of udon

34% by weight of water and 2% by weight of sodium chloride were added to each 1M fraction. After kneading for 6 minutes, the dough thus obtained was formulated into udon with a noodle-making machine.

The speck formation, color tone and appearance of the udon were evaluated immediately after the production and storing at 10° C. for 2 days and 5 days. Table 1 shows the results of the kojic acid lots. Table 2 shows the results of the cysteine lots.

For comparison, udon samples were produced: by using water free from any tyrosinase inhibitor and repeating the above-mentioned conditioning, roller milling and noodle-making procedures, i.e., control lot (Comparative Example 1); by adding 1000 ppm of kojic acid to the dough of the control lot in the noodle-making step (Comparative Example 2); and by adding 700 ppm of cysteine to the dough of the control lot in the noodle-making step (Comparative Example 3).

Table 3 shows the results.

In the following examples, the evaluation, the determination of the number of specks and the measurement of the color tone were made in accordance with the following methods:

(1) Evaluation

A sample was stored at 10° C. for 5 days and the number of specks, the surface color (i.e., lightness, hue and chroma) and the appearance were evaluated on day 2 and day 5.

(2) Determination of Number of Specks

Specks per square centimeter were counted with the naked eye under a magnifier.

(3) Measurement of color tone

The surface color was measured by using an SZ-Σ80 model color difference meter (a product of Nippon Denshoku Ind. Co., Ltd.). L, a and b in the Hunter color indication method were measured and the surface color was expressed in lightness (L), hue (|a/b|) and chroma ($\sqrt{a^2+b^2}$).

A larger "L" stands for the brighter color, i.e., serving as an indicator of brightness.

A positive value of "a" stands for red, while a negative one stands for green.

A positive value of "b" stands for yellow, while a negative one stands for blue.

TABLE 1

| Kojic acid lot | Remaining in the wheat flour | | Immediately after the production | Day 2 | Day 5 | Evaluation |
|---|---|---|---|---|---|---|
| 1500 ppm | 15 ppm | Speck no. | 0 | 4 | 7 | Few specks and good color tone. |
| | | L | 82.5 | 72.4 | 70.3 | |
| | | a | −2.2 | −2.5 | −2.2 | |
| | | b | 15.9 | 16.5 | 15.6 | |
| | | |a/b| (×10²) | 13.8 | 15.2 | 14.1 | |
| | | $\sqrt{a^2+b^2}$ | 16.1 | 16.7 | 15.6 | |
| 500 ppm | 5 ppm | Speck no. | 1 | 6 | 11 | Few specks and good color tone. |
| | | L | 81.8 | 72.4 | 70.1 | |
| | | a | −2.1 | −2.5 | −2.2 | |
| | | b | 15.7 | 16.6 | 15.6 | |
| | | |a/b| (×10²) | 13.4 | 15.1 | 14.1 | |
| | | $\sqrt{a^2+b^2}$ | 15.8 | 16.8 | 15.8 | |
| 50 ppm | 0.5 ppm | Speck no. | 2 | 9 | 14 | Some specks and good color tone. |
| | | L | 81.8 | 72.4 | 69.8 | |
| | | a | −2.1 | −2.5 | −2.2 | |

TABLE 1-continued

| Kojic acid lot | Remaining in the wheat flour | | Immediately after the production | Day 2 | Day 5 | Evaluation |
|---|---|---|---|---|---|---|
| | | b | 15.7 | 16.5 | 15.6 | |
| | | |a/b| (×10²) | 13.4 | 15.2 | 14.1 | |
| | | $\sqrt{a^2 + b^2}$ | 15.8 | 16.7 | 15.6 | |
| 5 ppm | 0.05 ppm | Speck no. | 2 | 10 | 20 | Many specks but good color tone. |
| | | L | 81.6 | 72.3 | 69.7 | |
| | | a | −2.0 | −2.4 | −2.1 | |
| | | b | 15.5 | 16.4 | 15.5 | |
| | | |a/b| (×10²) | 12.9 | 14.6 | 13.5 | |
| | | $\sqrt{a^2 + b^2}$ | 15.6 | 16.6 | 15.6 | |

TABLE 2

| Cysteine lot | Remaining in the wheat flour | | Immediately after the production | Day 2 | Day 5 | Evaluation |
|---|---|---|---|---|---|---|
| 3500 ppm | 30 ppm | Speck no. | 0 | 5 | 8 | Few specks and good color tone. |
| | | L | 82.0 | 73.0 | 70.0 | |
| | | a | −2.2 | −2.4 | −2.2 | |
| | | b | 15.8 | 16.2 | 15.3 | |
| | | |a/b| (×10²) | 13.9 | 14.8 | 14.4 | |
| | | $\sqrt{a^2 + b^2}$ | 16.0 | 16.4 | 15.5 | |
| 350 ppm | 3 ppm | Speck no. | 1 | 7 | 11 | Few specks and good color tone. |
| | | L | 82.2 | 73.3 | 70.2 | |
| | | a | −2.1 | −2.4 | −2.2 | |
| | | b | 15.8 | 16.2 | 15.2 | |
| | | |a/b| (×10²) | 13.3 | 14.8 | 14.5 | |
| | | $\sqrt{a^2 + b^2}$ | 15.9 | 16.4 | 15.4 | |
| 35 ppm | 0.3 ppm | Speck no. | 2 | 9 | 15 | Some specks and good color tone. |
| | | L | 82.4 | 72.9 | 69.3 | |
| | | a | −2.1 | −2.4 | −2.1 | |
| | | b | 15.7 | 16.3 | 15.3 | |
| | | |a/b| (×10²) | 13.4 | 14.7 | 13.7 | |
| | | $\sqrt{a^2 + b^2}$ | 15.8 | 16.5 | 15.4 | |
| 3.5 ppm | 0.03 ppm | Speck no. | 2 | 11 | 20 | Many specks but good color tone. |
| | | L | 82.6 | 72.3 | 68.8 | |
| | | a | −2.0 | −2.4 | −2.1 | |
| | | b | 15.6 | 16.4 | 15.4 | |
| | | |a/b| (× 10²) | 12.8 | 14.6 | 13.6 | |
| | | $\sqrt{a^2 + b^2}$ | 15.7 | 16.6 | 15.5 | |

TABLE 3

| Comparative Ex. | Remaining in the wheat flour | | Immediately after the production | Day 2 | Day 5 | Evaluation |
|---|---|---|---|---|---|---|
| Control noodle (Comp. Ex. 1) | — | Speck no. | 3 | 12 | 24 | Many specks. |
| | | L | 82.7 | 72.5 | 68.6 | |
| | | a | −2.0 | −2.4 | −2.1 | |
| | | b | 15.6 | 16.4 | 15.5 | |
| | | |a/b| (×10²) | 12.8 | 14.6 | 13.5 | |
| | | $\sqrt{a^2 + b^2}$ | 15.7 | 16.6 | 15.6 | |

TABLE 3-continued

| Compara- tive Ex. | Remaining in the wheat flour | | Immediately after the production | Day 2 | Day 5 | Evaluation |
|---|---|---|---|---|---|---|
| Conventional addition method kojic acid: 1000 ppm (Comp. Ex. 2) | | Speck no. | 2 | 10 | 15 | Some specks, serious yellowing and colortone largely different from udon. |
| | | L | 81.4 | 69.6 | 67.1 | |
| | | a | −1.5 | −0.4 | 0.0 | |
| | | b | 16.3 | 19.5 | 19.9 | |
| | | Ia/bI (×10$^2$) | 9.2 | 2.1 | 0.0 | |
| | | $\sqrt{a^2 + b^2}$ | 16.4 | 19.5 | 19.9 | |
| Conventional addition method cysteine: 700 ppm (Comp. Ex. 3) | | Speck no. | 2 | 11 | 22 | Many specks, very intense white color largely different from udon and sagging in dough. |
| | | L | 80.8 | 71.5 | 66.8 | |
| | | a | −2.5 | −3.0 | −2.8 | |
| | | b | 15.3 | 14.0 | 11.7 | |
| | | Ia/bI (×10$^2$) | 16.3 | 21.4 | 23.9 | |
| | | $\sqrt{a^2 + b^2}$ | 15.5 | 14.3 | 12.0 | |

As the above Tables 1 and 2 show, the speck formation was suppressed in Example 1 except the kojic acid 5 ppm lot (remaining: 0.05 ppm) and the cysteine 3.5 ppm lot (remaining: 0.03 ppm), compared with Comparative Example 1. None of the disadvantages for udon as observed in Comparative Examples 2 and 3 was shown in the samples of Example 1.

As Table 3 shows, the sample of Comparative Example 2 showed somewhat suppressed speck formation but exhibited a color tone seriously different from that of udon due to the yellow coloration of the kojic acid added. In Comparative Example 3, scarcely any effect of suppressing speck formation was observed. Also, the dough showed an intense white color and could hardly retain the shape of udon. Namely, this sample was largely different from udon both in color tone and appearance.

EXAMPLE 2

Production of the pasta wrapping for jiaozi

Kojic acid lots and cysteine lots were prepared and ground by repeating the procedures of Example 1. 34% by weight of water and 1% by weight of sodium chloride were added to each 1M fraction. After mixing for 6 minutes, the pasta wrapping for jiaozi was produced with a noodle-making machine and evaluated by the same methods as those described in Example 1. Table 4 shows the results of the kojic acid lots. Table 5 shows the results of the cysteine lots.

For comparison, pasta wrapping for jiaozi samples were produced: by using water free from any tyrosinase inhibitor and repeating the above-mentioned conditioning, roller milling and noodle-making procedures, i.e., control lot (Comparative Example 4); by adding 1000 ppm of kojic acid to the dough of the control lot in the noodle-making step (Comparative Example 5); and by adding 700 ppm of cysteine to the dough of the control lot in the noodle-making step (Comparative Example 6).

Table 6 shows the results.

TABLE 4

| Kojic acid lot | Remaining in the wheat flour | | Immediately after the production | Day 2 | Day 5 | Evaluation |
|---|---|---|---|---|---|---|
| 1500 ppm | 15 ppm | Speck no. | 0 | 4 | 6 | Few specks and good color tone. |
| | | L | 82.2 | 72.0 | 70.1 | |
| | | a | −2.2 | −2.5 | −2.2 | |
| | | b | 16.0 | 16.6 | 15.6 | |
| | | Ia/bI (× 10$^2$) | 13.8 | 15.1 | 14.1 | |
| | | $\sqrt{a^2 + b^2}$ | 16.2 | 16.8 | 15.6 | |
| 500 ppm | 5 ppm | Speck no. | 1 | 6 | 10 | Few specks and good color tone. |
| | | L | 81.5 | 72.2 | 70.0 | |
| | | a | −2.1 | −2.5 | −2.2 | |
| | | b | 15.7 | 16.7 | 15.7 | |
| | | Ia/bI (× 10$^2$) | 13.4 | 15.0 | 14.0 | |
| | | $\sqrt{a^2 + b^2}$ | 15.8 | 16.9 | 15.9 | |

TABLE 4-continued

| Kojic acid lot | Remaining in the wheat flour | | Immediately after the production | Day 2 | Day 5 | Evaluation |
|---|---|---|---|---|---|---|
| 50 ppm | 0.5 ppm | Speck no. | 2 | 9 | 15 | Some specks and good color tone. |
| | | L | 81.6 | 72.3 | 69.8 | |
| | | a | −2.1 | −2.5 | −2.2 | |
| | | b | 15.7 | 16.5 | 15.6 | |
| | | Ia/bI (×10²) | 13.4 | 15.2 | 14.1 | |
| | | $\sqrt{a^2+b^2}$ | 15.8 | 16.7 | 15.6 | |
| 5 ppm | 0.05 ppm | Speck no. | 2 | 11 | 21 | Many specks but good color tone. |
| | | L | 81.3 | 72.2 | 69.6 | |
| | | a | −2.1 | −2.4 | −2.1 | |
| | | b | 15.6 | 16.4 | 15.5 | |
| | | Ia/bI (×10²) | 13.5 | 14.6 | 13.5 | |
| | | $\sqrt{a^2+b^2}$ | 15.7 | 16.6 | 15.6 | |

TABLE 5

| Cysteine lot | Remaining in the wheat flour | | Immediately after the production | Day 2 | Day 5 | Evaluation |
|---|---|---|---|---|---|---|
| 3500 ppm | 30 ppm | Speck no. | 0 | 5 | 7 | Few specks and good color tone. |
| | | L | 81.8 | 72.9 | 69.8 | |
| | | a | −2.2 | −2.5 | −2.2 | |
| | | b | 15.9 | 16.5 | 15.2 | |
| | | Ia/bI (×10²) | 13.8 | 15.2 | 14.5 | |
| | | $\sqrt{a^2+b^2}$ | 16.1 | 16.7 | 15.4 | |
| 350 ppm | 3 ppm | Speck no. | 1 | 6 | 11 | Few specks and good color tone. |
| | | L | 82.0 | 73.1 | 70.0 | |
| | | a | −2.1 | −2.4 | −2.2 | |
| | | b | 15.8 | 16.2 | 15.3 | |
| | | Ia/bI (×10²) | 13.3 | 14.8 | 14.4 | |
| | | $\sqrt{a^2+b^2}$ | 15.9 | 16.4 | 15.5 | |
| 35 ppm | 0.3 ppm | Speck no. | 2 | 8 | 14 | Some specks and good color tone. |
| | | L | 82.3 | 72.8 | 69.3 | |
| | | a | −2.1 | −2.4 | −2.1 | |
| | | b | 15.7 | 16.4 | 15.3 | |
| | | Ia/bI (×10²) | 13.4 | 14.6 | 13.7 | |
| | | $\sqrt{a^2+b^2}$ | 15.8 | 16.6 | 15.4 | |
| 3.5 ppm | 0.03 ppm | Speck no. | 2 | 11 | 20 | Many specks but good color tone. |
| | | L | 82.6 | 72.3 | 68.8 | |
| | | a | −2.0 | −2.4 | −2.1 | |
| | | b | 15.5 | 16.4 | 15.4 | |
| | | Ia/bI (×10²) | 12.9 | 14.6 | 13.6 | |
| | | $\sqrt{a^2+b^2}$ | 15.6 | 16.6 | 15.5 | |

TABLE 6

| Comparative Ex. | Remaining in the wheat flour | | Immediately after the production | Day 2 | Day 5 | Evaluation |
|---|---|---|---|---|---|---|
| Control wrapping (Comp. Ex. 4) | — | Speck no. | 3 | 13 | 25 | Many specks. |
| | | L | 82.4 | 72.2 | 68.3 | |
| | | a | −2.0 | −2.4 | −2.2 | |
| | | b | 15.6 | 16.4 | 15.6 | |
| | | Ia/bI (×10²) | 12.8 | 14.6 | 14.1 | |

TABLE 6-continued

| Compara-tive Ex. | Remaining in the wheat flour | | Immediately after the production | Day 2 | Day 5 | Evaluation |
|---|---|---|---|---|---|---|
| | | $\sqrt{a^2 + b^2}$ | 15.7 | 16.6 | 15.8 | |
| Conventional addition method kojic acid: 1000 ppm (Comp. Ex. 5) | | Speck no. | 2 | 9 | 15 | Some specks, serious yellowing and color tone largely different from jiaozi wrapping. |
| | | L | 81.0 | 69.3 | 66.8 | |
| | | a | −1.5 | −0.5 | 0.0 | |
| | | b | 16.3 | 19.7 | 19.9 | |
| | | Ia/bI (×10²) | 9.2 | 2.5 | 0.0 | |
| | | $\sqrt{a^2 + b^2}$ | 16.4 | 19.7 | 19.9 | |
| Conventional addition method cysteine: 700 ppm (Comp. Ex. 6) | | Speck no. | 3 | 12 | 22 | Many specks, very intense white color largely different from jiaozi wrapping and sagging in dough. |
| | | L | 80.5 | 71.3 | 66.7 | |
| | | a | −2.5 | −3.0 | −2.8 | |
| | | b | 15.5 | 14.0 | 11.8 | |
| | | Ia/bI (×10²) | 16.1 | 21.4 | 23.7 | |
| | | $\sqrt{a^2 + b^2}$ | 15.7 | 14.3 | 12.1 | |

As the above Tables 4 and 5 show, the specking was suppressed in Example 2 except the kojic acid 5 ppm lot (remaining: 0.05 ppm) and the cysteine 3.5 ppm lot (remaining: 0.03 ppm), compared with Comparative Example 4. None of the disadvantages for jiaozi wrapping as observed in Comparative Examples 5 and 6 was shown in the samples of Example 2.

As Table 6 shows, the sample of Comparative Example 5 showed somewhat suppressed Speck formation but a color tone seriously different from that of the pasta wrapping for jiaozi due to the yellow coloration of the kojic acid added. In Comparative Example 6, scarcely any effect of suppressing speck formation was observed. Also, the dough showed an intense white color and could hardly retain the shape of the pasta wrapping for jiaozi. Namely, this sample was largely different from the pasta wrapping for jiaozi both in color tone and appearance.

EXAMPLE 3

Production of Chinese noodles

Kojic acid lots and cysteine lots were prepared and ground by repeating the procedures of Example 1. 32% by weight of water, 1% by weight of sodium chloride and 1% by weight of "kansui" (alkaline agent) were added to each 1M fraction. After kneading for 6 minutes, Chinese noodles were produced with a noodle-making machine and evaluated by the same methods as those described in Example 1. Table 7 shows the results of the kojic acid lots, Table 8 shows the results of the cysteine lots.

In Comparative Example, the control lot (Comparative Example 7) wherein Chinese noodles were produced by conditioning with the use of water free from any tyrosinase inhibitor and roller milling in the same manner was used. Table 9 shows the results of this Comparative Example.

TABLE 7

| Kojic acid lot | Remaining in the wheat flour | | Immediately after the production | Day 2 | Day 5 | Evaluation |
|---|---|---|---|---|---|---|
| 1500 ppm | 15 ppm | Speck no. | 4 | 25 | 34 | Few specks and somewhat good color tone. |
| | | L | 81.9 | 69.5 | 65.3 | |
| | | a | −3.3 | −2.8 | −2.3 | |
| | | b | 18.3 | 18.8 | 18.0 | |
| | | Ia/bI (×10²) | 18.1 | 14.9 | 12.8 | |
| | | $\sqrt{a^2 + b^2}$ | 18.5 | 19.0 | 18.1 | |
| 500 ppm | 5 ppm | Speck no. | 5 | 33 | 41 | Few specks and somewhat good color tone. |
| | | L | 82.0 | 69.4 | 65.7 | |
| | | a | −3.3 | −2.8 | −2.2 | |
| | | b | 18.2 | 18.8 | 17.8 | |
| | | Ia/bI (×10²) | 18.1 | 14.9 | 12.4 | |
| | | $\sqrt{a^2 + b^2}$ | 18.5 | 19.0 | 17.9 | |
| 50 ppm | 0.5 ppm | Speck no. | 6 | 35 | 45 | Few specks and somewhat good color tone. |
| | | L | 81.8 | 69.2 | 65.3 | |
| | | a | −3.2 | −2.8 | −2.2 | |
| | | b | 18.0 | 18.6 | 17.9 | |

TABLE 7-continued

| Kojic acid lot | Remaining in the wheat flour | | Immediately after the production | Day 2 | Day 5 | Evaluation |
|---|---|---|---|---|---|---|
| | | Ia/bI (×10²) | 17.8 | 15.1 | 12.3 | |
| | | $\sqrt{a^2 + b^2}$ | 18.3 | 18.8 | 18.0 | |
| 5 ppm | 0.05 ppm | Speck no. | 8 | 43 | 65 | Many specks and similar color tone as that of Comp. Ex. 1. |
| | | L | 81.5 | 68.9 | 64.9 | |
| | | a | −3.2 | −2.8 | −2.2 | |
| | | b | 17.7 | 18.4 | 18.0 | |
| | | Ia/bI (×10²) | 18.1 | 15.2 | 12.2 | |
| | | $\sqrt{a^2 + b^2}$ | 18.0 | 18.6 | 18.1 | |

TABLE 8

| Cysteine lot | Remaining in the wheat flour | | Immediately after the production | Day 2 | Day 5 | Evaluation |
|---|---|---|---|---|---|---|
| 3500 ppm | 30 ppm | Speck no. | 5 | 26 | 35 | Few specks and somewhat good color tone. |
| | | L | 82.3 | 69.9 | 66.1 | |
| | | a | −3.3 | −2.9 | −2.3 | |
| | | b | 18.0 | 18.9 | 18.1 | |
| | | Ia/bI (×10²) | 18.3 | 15.3 | 12.7 | |
| | | $\sqrt{a^2 + b^2}$ | 18.3 | 19.1 | 18.2 | |
| 350 ppm | 3 ppm | Speck no. | 5 | 32 | 41 | Few specks and somewhat good color tone. |
| | | L | 82.2 | 69.9 | 65.9 | |
| | | a | −3.3 | −2.8 | −2.3 | |
| | | b | 17.9 | 18.9 | 18.0 | |
| | | Ia/bI (×10²) | 18.4 | 14.8 | 12.8 | |
| | | $\sqrt{a^2 + b^2}$ | 18.2 | 19.1 | 18.1 | |
| 35 ppm | 0.3 ppm | Speck no. | 6 | 37 | 45 | Few specks and somewhat good color tone. |
| | | L | 82.0 | 69.5 | 65.5 | |
| | | a | −3.3 | −2.8 | −2.3 | |
| | | b | 17.7 | 18.6 | 18.0 | |
| | | Ia/bI (×10²) | 18.6 | 15.1 | 12.8 | |
| | | $\sqrt{a^2 + b^2}$ | 18.0 | 18.8 | 18.1 | |
| 3.5 ppm | 0.03 ppm | Speck no. | 8 | 44 | 65 | Many specks and similar color tone as that of Comp. Ex. 1. |
| | | L | 81.5 | 69.0 | 65.0 | |
| | | a | −3.2 | −2.7 | −2.2 | |
| | | b | 17.5 | 18.4 | 18.0 | |
| | | Ia/bI (×10²) | 18.3 | 14.7 | 12.2 | |
| | | $\sqrt{a^2 + b^2}$ | 17.8 | 18.6 | 18.1 | |

TABLE 9

| Comparative Ex. | Remaining in the wheat flour | | Immediately after the production | Day 2 | Day 5 | Evaluation |
|---|---|---|---|---|---|---|
| Control Chinese noodle (Comp. Ex. 7) | — | Speck no. | 10 | 50 | 70 | Many specks. |
| | | L | 81.3 | 68.8 | 64.6 | |
| | | a | −3.2 | −2.7 | −2.2 | |
| | | b | 17.5 | 18.3 | 18.0 | |
| | | Ia/bI (×10²) | 18.3 | 14.8 | 12.2 | |
| | | $\sqrt{a^2 + b^2}$ | 17.8 | 18.5 | 18.1 | |

As the above Tables 7 to 9 show, the speck formation was suppressed in Example 3 except the kojic acid 5 ppm lot (remaining: 0.05 ppm) and the cysteine 3.5 ppm lot (remaining: 0.03 ppm), compared with Comparative Example 7. Also, the deterioration in the color tone was relieved.

Effects of different roller milling methods

In this example, a test milling machine was employed. In general, wheat flours differing in wheat bran content can be obtained by using different milling methods including roller milling procedures. However, the effects of the present invention can be achieved regardless of the difference in roller milling procedures, etc.

By adding a tyrosinase inhibitor to wheat before roller milling, the tyrosinase inhibitor can be efficiently contacted with tyrosinase contained in wheat bran and therearound. Thus, a tyrosinase inhibitor which has previously been considered as useless in suppressing speck formation can be utilized as a speck suppressor. Further, a wheat flour, which contains a reduced amount of a tyrosinase inhibitor compared with the conventional flours but shows suppressed speck formation, can be thus provided. As a result, the problem of the coloration induced by the tyrosinase inhibitor per se encountered in the conventional methods for the production of noodles by adding a tyrosinase inhibitor to wheat flour can be solved in the present invention. Thus, fresh noodles, dried noodles and tenobe somen with suppressed speck formation and suppressed deterioration in color tone can be provided.

The wheat flour obtained in accordance with the present invention is applicable not only to noodles but also to any doughs, pastes and batters prepared by adding water to wheat flour and kneading, as described in "Shokuhin Kogyo Sogo Jiten (Dictionary of Food Technology)"; ed. by JAPANESE SOCIETY FOR FOOD SCIENCE AND TECHNOLOGY.

While the invention has been described in detail and with reference to specific examples thereof, it will be apparent to one skilled in the art that various changes and modifications can be made therein without departing from the spirit and scope thereof.

What is claimed is:

1. A process for producing wheat flour used to make tenobe somen noodles, dried noodles, udon noodles, Chinese noodles, or pasta wrapping for jiaozi which have reduced speck formation and retain the desired color, said process comprising the steps of:
    (a) adding kojic acid to wheat grain prior to roller milling said wheat grain, wherein said wheat grain is that used to make said wheat flour that is used to produce tenobe somen noodles, dried noodles, udon noodles, Chinese noodles, or pasta wrapping for jiaozi; and
    (b) roller milling the resulting wheat grain of step (a) into said wheat flour.

2. The process for producing wheat flour as claimed in claim 1, wherein said kojic acid is added in a conditioning step.

3. The process of claim 1 wherein 10 ppm to 5,000 ppm of kojic acid is added to said wheat grain based on the weight of said wheat flour.

4. The process of claim 3 wherein 50 ppm to 3,500 ppm of kojic acid is added to said wheat grain based on the weight of said wheat flour.

5. A process for producing a secondarily processed flour product with reduced speck formation while retaining the desired color, said process comprising the steps of:
    (a) adding kojic acid to wheat grain prior to roller milling said wheat grain, wherein said wheat grain is that used to make wheat flour that is used to produce tenobe somen noodles, dried noodles, udon noodles, Chinese noodles, or pasta wrapping for jiaozi;
    (b) roller milling the resulting wheat grain of step (a) into a wheat flour; and
    (c) producing the secondarily processed flour product from said wheat flour of step (b);
wherein the secondarily processed flour product is selected from the group consisting of Chinese noodles, tenobe somen noodles, dried noodles, pasta wrapping for jiaozi and udon noodles.

6. The process of claim 5, wherein said kojic acid is added in a conditioning step.

7. The process of claim 5, wherein 10 ppm to 5,000 ppm of kojic acid is added to said wheat grain based on the weight of said wheat flour.

8. The process of claim 7, wherein 50 ppm to 3,500 ppm of kojic acid is added to said wheat grain based on the weight of said wheat flour.

9. A process for reducing speck formation in, and retaining the desired color of, tenobe somen noodles, dried noodles, udon noodles, Chinese noodles, or pasta wrapping for jiaozi, said process comprising the steps of:
    (a) adding kojic acid to wheat grain prior to roller milling said wheat grain, wherein said wheat grain is that used to make wheat flour that is used to produce tenobe somen noodles, dried noodles, udon noodles, Chinese noodles, or pasta wrapping for jiaozi;
    (b) roller milling the resulting wheat grain of step (a) into said wheat flour; and
    (c) producing tenobe somen noodles, dried noodles, udon noodles, Chinese noodles, or pasta wrapping for jiaozi from the resulting wheat flour of step (b).

* * * * *